April 8, 1941.　　　　J. M. OLDHAM　　　　2,237,624
FRICTION MEMBER
Filed Oct. 22, 1938
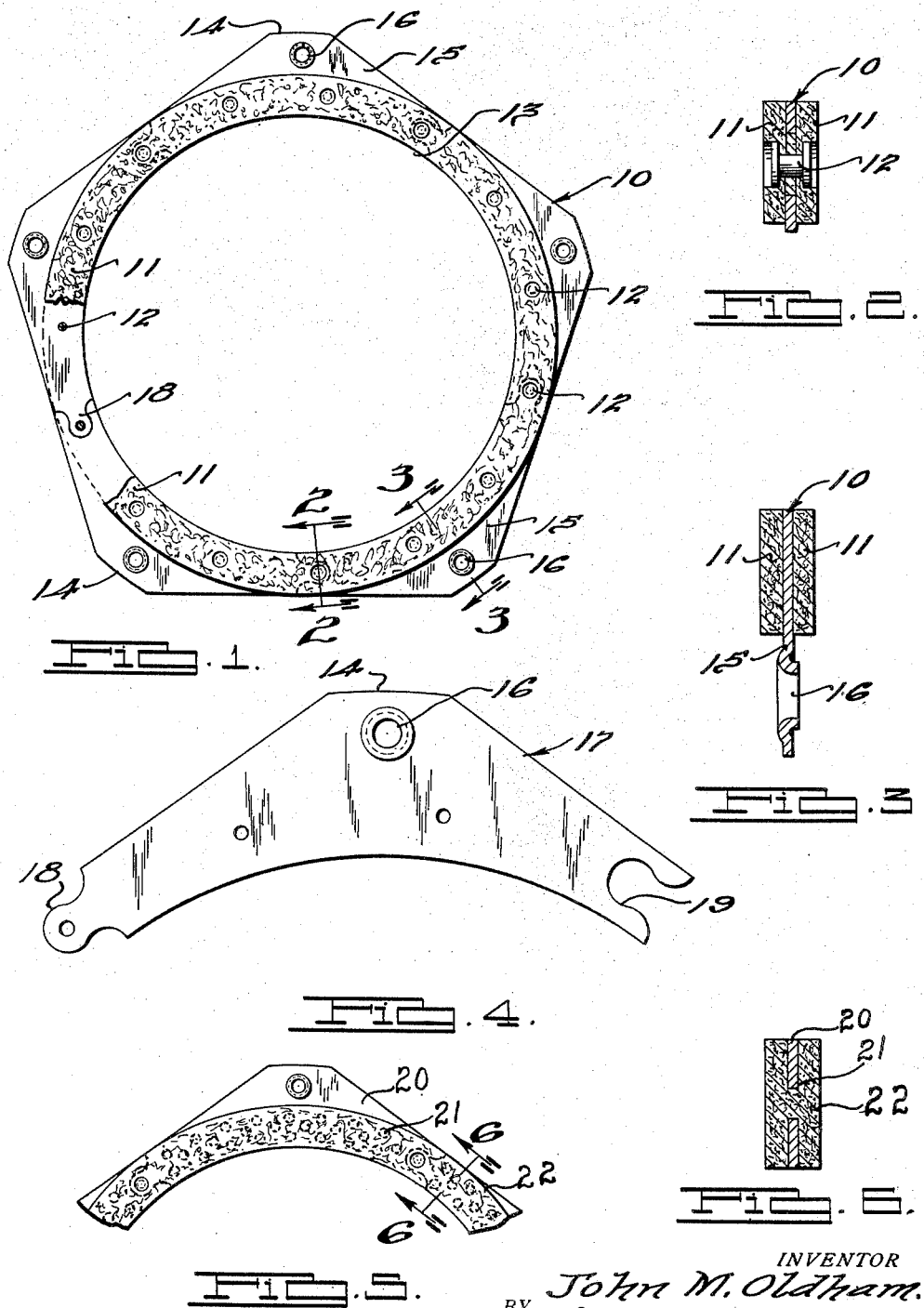
INVENTOR
John M. Oldham.
BY Dike, Calver & Gray
ATTORNEYS.

Patented Apr. 8, 1941

2,237,624

UNITED STATES PATENT OFFICE 2,237,624

FRICTION MEMBER

John M. Oldham, Pleasant Ridge, Mich., assignor to Leonard A. Young, Detroit, Mich.

Application October 22, 1938, Serial No. 236,391

2 Claims. (Cl. 192—107)

This invention relates to friction disks, such for instance as are used in brakes, clutches and the like. In one of its aspects the invention contemplates providing an improved method of manufacturing such disks, and particularly the lining-carrying plates therefor.

One of the objects of the present invention is to provide an improved friction disk having a carrying plate and a friction lining secured thereto.

Another object is to provide an improved lining-carrying plate for friction disks, which plate is susceptible to manufacture by stamping operations with the minimum amount of scrap in the sheet material used.

A further object of the invention is to provide an improved lining-carrying plate for a friction disk, said plate having means insuring easy and quick alignment of the disk in an operative position.

A further object of the invention is to provide an improved method of manufacturing annular members such, for instance, as lining-carrying plates for friction disks.

It is an added object of the invention to provide a friction disk of the foregoing character which is simple in construction, dependable in operation, and relatively inexpensive to manufacture.

Other objects of this invention will appear in the following description and appended claims, reference being had to the accompanying drawing forming a part of this specification wherein like reference characters designate corresponding parts in the several views.

Fig. 1 is a front view of a friction disk embodying the present invention.

Fig. 2 is a sectional view taken in the direction of the arrows on the section plane passing through the line 2—2 of Fig. 1.

Fig. 3 is a sectional view taken in the direction of the arrows on the section plane passing through the line 3—3 of Fig. 1.

Fig. 4 shows one of the stamped sections composing the lining-carrying plate of the friction disk.

Fig. 5 is a fragmentary plan view showing a segment of a modified form of friction disk embodying the present invention.

Fig. 6 is a section taken substantially on the line 6—6 of Fig. 5 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is shown, by way of example, a friction disk constructed in accordance with one embodiment of the present invention.

The friction disk hereinafter described is intended for incorporation in a brake structure. It will be understood, however, that friction disks constructed in accordance with the invention may be used also in other structures, such as in friction clutches and the like.

Referring to the drawing, the structure illustrated therein comprises generally a lining-carrying plate 10 and a frictional lining, which in one embodiment of the invention consists of two rings 11 made of suitable friction material which are secured to the plate 10 by means of a plurality of rivets 12. Both heads of each rivet are embedded in the material of the lining in order to prevent the heads of the rivets from coming in contact with the frictional surfaces of the brake or clutch structure.

The lining-carrying plate 10 has an opening 13 in its center, while its outside periphery may be made in the form of a polygon having any desired number of sides, five being used in the present instance, the corners of said polygon being rounded as indicated at 14. By virtue of the polygonal shape of the plate 10, there are formed on the plate 10 a plurality of extensions 15 which project beyond the lining 11. Said extensions 15 are provided with eyelets 16 which enable positive connection of the friction disk to the brake structure (not shown) and quick and easy alignment of the disk in said structure.

The plate 10 is stamped out of sheet metal, and comprises a number of sections such as the one illustrated in Fig. 4, which are positively interlocked together to form a single structure capable of resisting the operative loads which may be imposed thereon in actual operation. The sections 17 are substantially identical in their shape and can be manufactured with the use of a single die device. By virtue of such a construction extremely economical use of sheet metal is effected and wasteful scrap is prevented. It is clear that if the plate 10 is made integral, the circular blank stamped out to form the opening 13 has to be either scrapped or stored for use in some other article which may not be needed at that particular time.

The interlocking means are exemplified in the present embodiment of the invention by a projection 18 formed on one end of each section 17, and a corresponding recess 19 provided on the opposite end of each section and adapted to receive the projection 18 of the adjacent section, as is best illustrated at the left hand portion of Fig. 1, wherein the lining 11 is broken away to show the interlocking of the sections. The recess 19 and the projection 18 are of such sizes that the projection 18 has to be forced into the recess 19 by application of considerable force or pressure. In the present embodiment, the projections 18 are forced into the recesses 19 in the direction perpendicular to the surfaces of the section. I prefer to effect the same by assembling all the sections composing one plate in a device with projections 18 juxtaposed over the recesses 19, and to apply thereupon, in any suitable way, a sufficient force or pressure in order to force the projections 18 into the recesses 19 and in addition to exert a certain force on the joints so formed in order to effect some flow of metal around said joint. Such flow of metal, in addition to producing a very smooth joint, operates to lock the sections in a direction perpendicular to the surface of the sections and to prevent separation thereof in such direction. As can be seen from an examination of the drawing, the projections 18 are of such shape that they cannot be removed from the recesses 19 by application of a force in a longitudinal direction, that is around said ring or in a direction tangential thereto, such, for instance, as by application of a rotating force on the plate at the eyelets 16.

The adjoining ends of the separate sections may be united by deformation under pressure, welding or the like.

By virtue of such a construction a rigid plate is provided which is capable of withstanding all operative forces which the plate is intended to receive, and which is capable of being manufactured without the wasteful scrapping of large portions of the stock.

By making stamped annular members of interlocking sections as described above, a large variety of structures may be produced very economically. Assembly of the sections may be made in a suitable die, as indicated above, wherein deforming pressure on the joint is exerted by the die, or it may be done by hand, such as with the use of suitable anvil and hammer.

In the modification of the invention shown in Figs. 5 and 6, I propose to use an annular member built up of a plurality of stamped sections 20 which are generally similar in construction to the sections of the plate 10 and are united to form a continuous annular member in the same manner as previously described in connection with the description of the plate 10. Extending on a line generally concentric with the edge of the annulus in the member 10 is a perforated section 21 having a plurality of openings extending through the body of the section 21. The friction material 22, while in a plastic condition, is placed on opposite sides of the sections 20 and is molded and formed under pressures exerted thereon which cause the friction material 22 to flow through the openings in the perforated section 21. As the friction material is changed to its solid condition, it will be seen that it is interlocked with the plate.

It will be seen that the modified construction herein proposed effects a positive connection between the friction element and the carrying plate without requiring the use of rivets or similar fastening or connecting elements. While being economical in construction, it also possesses the desirable property of increasing the useful life of the friction member since substantially the entire friction surface may be consumed in use without fear of scoring brake drums or pressure members by pressure contact with the rivets or other connecting elements.

While this feature of connecting the plate and the friction material by molding and without the use of rivets has been disclosed herein as particularly applied to a disk type of friction element, it may also be applied to other types of friction elements, such for example as conventional types of brake shoes or the like.

Thus in one of its broader aspects my invention contemplates providing a built-up annular member adapted to carry a friction member or members, the said annular member being composed of interlocking identical sections joined together to form a unitary member capable of withstanding the operating forces which may be imposed upon it during its intended operation.

I claim:

1. A friction member including a lining-carrying plate, a lining secured thereto, said plate comprising a plurality of interfitting stamped sections together forming a polygon, an integrally formed projection on one end of each section and being of the same thickness as said section extended beyond the end in substantially the plane of the section adapted to be forced into a corresponding recess in the abutting end of the adjacent section in a direction transverse to the application of rotating force on said plate, the shape of said projections preventing separation of said sections in the direction of said force, each of said stamped sections providing more than one peripheral side wall of said polygon.

2. A friction member comprising a lining-carrying plate, a lining secured thereto, said plate comprising a plurality of stamped sections together forming substantially a polygon, an integrally formed projection on one end of each section of like thickness with said section and extended beyond said end in substantially the plane of the section adapted to enter a recess in the abutting end of the adjacent section, said projection being adapted to enter into said recesses in a direction transverse to the application of rotative force on said plate and to resist the separation of said sections in the direction of application of said force, and a perforated section on said plate adjacent the said lining adapted to interlock portions of said lining with said plate, each of said stamped sections providing more than one peripheral wall of said polygon.

JOHN M. OLDHAM.